US007506309B2

(12) United States Patent
Schaefer

(10) Patent No.: US 7,506,309 B2
(45) Date of Patent: Mar. 17, 2009

(54) METHOD FOR MANAGING VEHICLE SOFTWARE CONFIGURATION UPDATES

(75) Inventor: Mark S. Schaefer, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 928 days.

(21) Appl. No.: 10/806,920

(22) Filed: Mar. 23, 2004

(65) Prior Publication Data

US 2005/0216903 A1 Sep. 29, 2005

(51) Int. Cl.
*G06F 9/44* (2006.01)

(52) U.S. Cl. ........................................ 717/120; 701/29

(58) Field of Classification Search ......... 717/168–178, 717/120–122; 701/29–36; 455/415–420; 702/182–184, 162–164; 707/8.203
See application file for complete search history.

(56) References Cited

U.S. PATENT DOCUMENTS

| | | | | |
|---|---|---|---|---|
| 5,581,754 | A * | 12/1996 | Terry et al. | 707/8 |
| 5,603,026 | A * | 2/1997 | Demers et al. | 707/8 |
| 5,671,407 | A * | 9/1997 | Demers et al. | 707/8 |
| 5,896,566 | A * | 4/1999 | Averbuch et al. | 455/419 |
| 6,279,153 | B1 * | 8/2001 | Bi et al. | 717/171 |
| 6,317,754 | B1 * | 11/2001 | Peng | 707/203 |
| 6,687,587 | B2 * | 2/2004 | Kacel | 701/33 |
| 6,842,762 | B2 * | 1/2005 | Raithel et al. | 707/104.1 |
| 6,965,326 | B2 * | 11/2005 | Allison | 340/999 |
| 6,970,697 | B2 * | 11/2005 | Kouznetsov et al. | 455/418 |
| 7,117,494 | B2 * | 10/2006 | Rajaram | 717/174 |
| 7,188,341 | B1 * | 3/2007 | Hawthorne et al. | 717/171 |
| 7,272,475 | B2 * | 9/2007 | Gawlik et al. | 701/29 |
| 7,280,900 | B2 * | 10/2007 | Gault et al. | 701/33 |
| 7,366,589 | B2 * | 4/2008 | Habermas | 701/1 |

OTHER PUBLICATIONS

Framework for Security and Privacy in Automotive Telematics, Sastry Duri et al, ACM, Sep. 2002, pp. 25-32.*
Lucent Technologies to Provide ORiNOCO Wireless Networking and Internet Access for HP PCs, PR Newswire, Jun. 27, 2000, 2 pages.*
Focus on HP OpenView A Guide to Hewlett-Packard's Network and Systems Management Platform, Nathan J. Muller, 1995, Chapters 5-13.*

* cited by examiner

*Primary Examiner*—Todd Ingberg

(57) ABSTRACT

The present invention provides a system and a method for managing a software configuration of a vehicle. Software configuration update data for a vehicle is requested from a central database from one of a call center or a telematics unit. Vehicle software configuration data representative of a vehicle software configuration is retrieved. A determination is made whether the software configuration update data corresponds with the vehicle software configuration data and a software module is sent from the call center to the telematics unit via a wireless network based on the determination. A computer usable medium with suitable computer program code is employed for managing the software configuration of the vehicle.

9 Claims, 6 Drawing Sheets

200

METHOD FOR MANAGING VEHICLE SOFTWARE CONFIGURATION UPDATES

FIELD OF THE INVENTION

In general, the invention relates to software configuration management. More specifically, the invention relates to a method and system for vehicle software configuration management.

BACKGROUND OF THE INVENTION

One of the fastest growing areas of communications technology is related to automobile network solutions. The demand and potential for wireless vehicle communication, networking and diagnostics services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call center information, update controller systems, determine vehicle location, assist in tracking vehicle after a theft of the vehicle and provide other vehicle related services. Drivers can call telematic call centers and receive navigational, concierge, emergency, and location services, as well as other specialized help as locating the geographical location of a stolen vehicle and honking the horn of a vehicle when the owner cannot locate it in a large parking garage.

Controllers and software play a large role in the automation of an increasing number of vehicle functions. With the constant evolution of technologies, upgrades are frequently made to vehicle software modules to provide additional vehicle features or improve the performance of existing vehicle functions. The installation of upgraded software modules are currently handled manually by vehicle technicians at a vehicle dealership. Often times, there are long time gaps between visits to a vehicle dealership. As a result, the vehicle may not be available for a vehicle technician to manually upgrade the vehicle software modules to newer versions of vehicle software modules thereby depriving the vehicle owner of software upgrades and improved functionality of the vehicle.

Also malfunctioning telematics units are replaced in vehicles with new telematics units or telematics units taken from other vehicles. Newly installed telematics unit require the installation of software module specific to the vehicle. In many cases, controller operated vehicle devices require replacement. The replacement of such vehicle devices often require the reinstallation of software modules necessary for the operation of the vehicle devices. The manual installation of vehicle specific software can require costly vehicle technician time and may be time consuming.

It is desirable therefore, to provide a method and system for vehicle software configuration management, that overcomes the challenges and obstacles described above.

SUMMARY OF THE INVENTION

One aspect of the invention presents a method for managing a software configuration of a vehicle. The method comprises requesting a software configuration update data for a vehicle from a central database from one of a call center or a telematics unit and retrieving a vehicle software configuration data representative of a vehicle software configuration. It is determined whether the software configuration update data corresponds with the vehicle software configuration data. A software module is sent from the call center to the telematics unit via a wireless network based on the determination.

Another aspect of the invention presents a computer readable medium storing a computer program for managing a software configuration of a vehicle. The computer readable medium comprises computer readable code for requesting a software configuration update data for a vehicle from a central database from one of a call center or a telematics unit and computer readable code for retrieving a vehicle software configuration data representative of a vehicle software configuration. The computer readable medium further comprises computer readable code for determining whether the software configuration update data corresponds with the vehicle software configuration data and computer readable code for sending a software module from the call center to the telematics unit via a wireless network based on the determination.

Another aspect of the invention provides a system for managing a software configuration of a vehicle. The system comprises means for requesting a software configuration update data for a vehicle from a central database from one of a call center or a telematics unit and means for retrieving a vehicle software configuration data representative of a vehicle software configuration. The system further comprises means for determining whether the software configuration update data corresponds with the vehicle software configuration data and means for sending a software module from the call center to the telematics unit via a wireless network based on the determination.

The foregoing and other features and advantages of the invention will become further apparent from the following detailed description of the presently preferred embodiment, read in conjunction with the accompanying drawings. The detailed description and drawings are merely illustrative of the invention rather than limiting the scope of the invention being defined by the appended claims and equivalents thereof.

DETAILED DESCRIPTION OF THE PRESENTLY PREFERRED EMBODIMENTS

Figure 1:
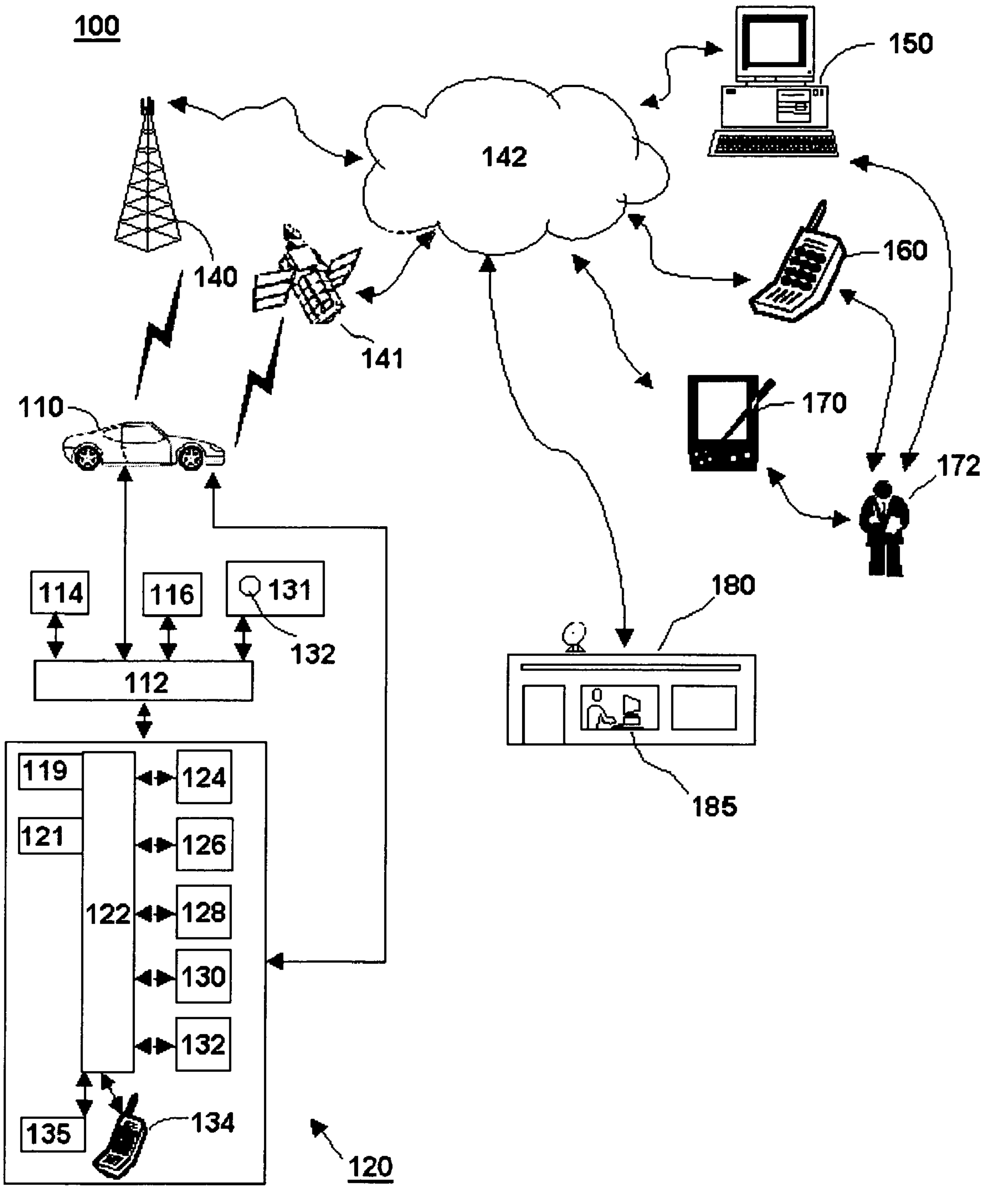
FIG. 1 is a schematic diagram of a system for managing software configuration of a vehicle in accordance with one embodiment of the present invention.

FIG. 1 is a schematic diagram of a system for vehicle software configuration management using a wireless communication system in accordance with one embodiment of the present invention at 100. The vehicle software configuration management system 100 includes one or more vehicles 110, a telematics unit 120, one or more wireless carrier systems 140 or satellite carrier systems 141, one or more communication networks 142, and one or more call centers 180. The vehicle 110 is a vehicle such as a car or truck equipped with suitable hardware and software for transmitting and receiving voice and data communications.

The vehicle 110 via the telematics unit 120 transmits and receives radio transmissions from the wireless carrier system 140, or the satellite carrier system 141. The wireless carrier system 140, the satellite carrier system 141 or any other suitable communication system communicatively couples the vehicle 110 to the communication network 142.

The communication network 142 includes services from mobile telephone switching offices, wireless networks, public-switched telephone networks, and Internet protocol (IP) networks. The communication network 142 comprises a wired network, an optical network, a fiber network, another wireless network, or any combination thereof. The communication network 142 is communicatively coupled to the vehicle 110 via the wireless carrier system 140, or via the satellite carrier system 141. The communication network 142 communicatively couples the wireless carrier system 140 or the satellite carrier system 141 to a user computer 150, a wireless or wired phone 160, a handheld device 170, such as a personal digital assistant, and the call center 180. The communication network 142 uses any appropriate wireless technology, including CDMA, TDMA, FDMA, and GSM or satellite carrier system.

The communication network 142 can transmit and receive short messages according to established protocols such as IS-637 standards for short message service (SMS), IS-136 air-interface standards for SMS, and GSM 03.40 and 09.02 standards.

The call center 180 is a location where many calls can be received and serviced at the same time, or where many calls can be sent at the same time. In one embodiment, the call center 180 is a voice call center, providing verbal communications between a communication services advisor 185 in the call center 180 and a subscriber. In another embodiment, the call center 180 contains any combination of hardware or software facilitating data transmissions between the call center 180 and the vehicle 110. In one embodiment of the invention, the call center is a telematics call center, facilitating communications to and from the telematics unit 120 in the vehicle 110. In a further embodiment, the call center 180 is any combination of the previously described functions.

The communication services advisor 185 is a real advisor or a virtual advisor. A real advisor is a human being in verbal communication with a user or subscriber. A virtual advisor is a synthesized voice interface responding to requests from user or subscriber. In one embodiment, virtual advisor includes one or more recorded messages. In another embodiment, virtual advisor generates voice messages using a text to speech synthesis engine (TTS). In another embodiment, the virtual advisor includes both recorded and TTS generated messages.

The call center 180 provides services to telematics unit 120. The communication services advisor 185 provides one of a number of support services to a subscriber. The call center 180 can transmit data via data signal, such as a vehicle data upload (VDU), to the telematics unit 120 in vehicle 110 through wireless carrier system 140, satellite carrier systems 141, or communication network 142.

In one embodiment of the invention, the user 172 has a local provisioning system such as a user computer 150 or a handheld device 170. The local provisioning system has a wireless modem to send data through wireless carrier system 140, or satellite carrier system 141, which connects to communication network 142. In another embodiment, local provisioning system has a wired modem, which connects to communications network 142. The data is received at call center 180. The call center 180 has any suitable hardware and software capable of providing web services to help transmit messages and data signals from local provisioning system, such as, a user computer 150 or a handheld device 170 to the telematics unit 120 in the vehicle 110. In another embodiment, a user computer 150 or a handheld device 170 has suitable hardware and software to connect to the vehicle 110 using a direct link to a vehicle onboard data port.

In one embodiment of the invention, the telematics unit 120 includes a digital signal processor (DSP) 122 connected to a wireless modem 124, a global positioning system (GPS) receiver or GPS unit 126, and an in-vehicle memory 128. The DSP 122 is also referred to as a microcontroller, ASIC, controller, host processor, or vehicle communications processor. The GPS unit 126 provides longitude and latitude coordinates of the vehicle 110, as well as a time stamp and a date stamp. In one embodiment of the invention, DSP 122 is connected to at least one of a wireless microphone 130, one or more speakers 132, an embedded or in-vehicle phone 134 and an email access appliance 135

The telematics unit 120 is communicatively coupled to various vehicle components via a vehicle communication bus 112. Examples of vehicle components include vehicle control modules 114, and vehicle sensors 116. Many vehicle components 114, 116 require a dedicated software module to enable operation of the vehicle component 114, 116. Examples of vehicle control modules 114 include, but are not limited to, the engine control module and the brake control module. In one embodiment, illustrated and explained in greater detail below in FIG. 2, vehicle components 114, 116 that require a dedicated software module include a module processor 131 in communication with a module memory 132. In another embodiment, vehicle components 114, 116 that require a dedicated software module include a module memory 132 in communication with vehicle communication bus 112. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications. Module processor 131 and module memory 132 may be independent from vehicle components 114, 116 (as illustrated in FIG. 1), or module processor 131 and module memory 132 be part of vehicle components 114, 116 (as illustrated in FIG. 2)

Figure 2:
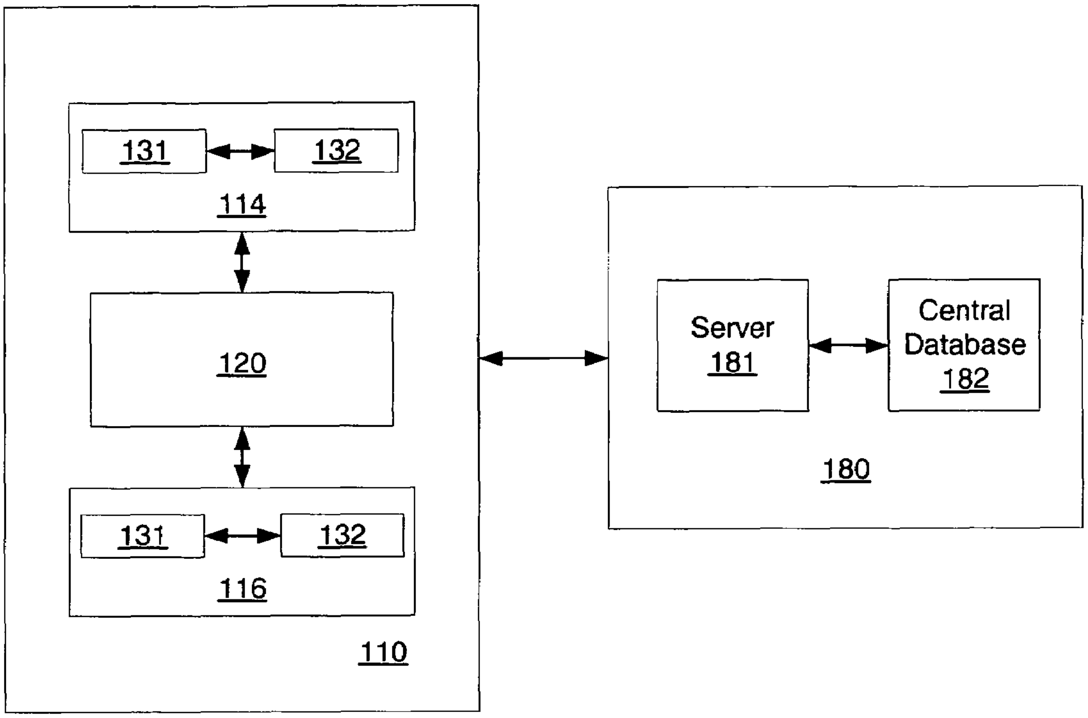
FIG. 2 is a schematic diagram of the telematic call center and a vehicle in accordance with one embodiment of the present invention.

FIG. 2 is a schematic diagram of a telematics call center 180 of FIG. 1 and a vehicle 110 of FIG. 1 in accordance with one embodiment of the present invention at 200. Like numbers of FIG. 2 describe like structures described in FIG. 1. The telematics call center 180 includes a server 181 and a central database 182. The server 181 initiates requests to and responds to requests from the telematics unit 120 and facilitates the transfer of data between the central database 182 and the telematics unit 120. The central database 182 maintains a record for every vehicle 110 in the software configuration management system 100 of FIG. 1. In one embodiment, a unique vehicle identification tag is assigned to every vehicle 110. The vehicle specific records in the central database 182 are maintained according to the unique vehicle identification tag assigned to the vehicle 110. In one embodiment, the unique vehicle identification tag is the vehicle identification number (VIN) for the vehicle 110. Every vehicle 110 has its own record and every record includes vehicle specific software configuration data. The software configuration data for a vehicle 110 depends on vehicle specific factors including, but not limited to, vehicle make, vehicle model, vehicle year, and customized vehicle features. Every vehicle 110 includes a predefined set of software modules to enable operation of many of the vehicle components 114, 116 of that vehicle 110. Each vehicle component 114, 116 contains a module processor 131 in communication with module memory 132. The software configuration data for a specific vehicle 110 includes a listing of the software identification tags for the most recent version of the predefined set of software modules. The software identification tag identifies the vehicle component 114, 116 that the software module is adapted to control and the software module version number.

The vehicle software configuration data is stored in the telematics unit 120. The vehicle software configuration data includes a listing of the software identification tags for the software modules that the telematics unit 120 views as having been installed in the vehicle 110. The software identification tags identify the vehicle component 114, 116 that the software module is adapted to control and the software module version number.

The actual software modules in the vehicle 110 reside in the vehicle component memory 132. The vehicle component 114, 116 also stores the software identification tag for the actual software module in vehicle module memory 132. For example, the engine controller software module resides in the engine controller module memory and the software identification tag associated with that software module in also stored in the engine controller module memory. The engine controller software identification tag identifies the software module as a engine controller software module and the version of the engine controller software module.

Figure 3:
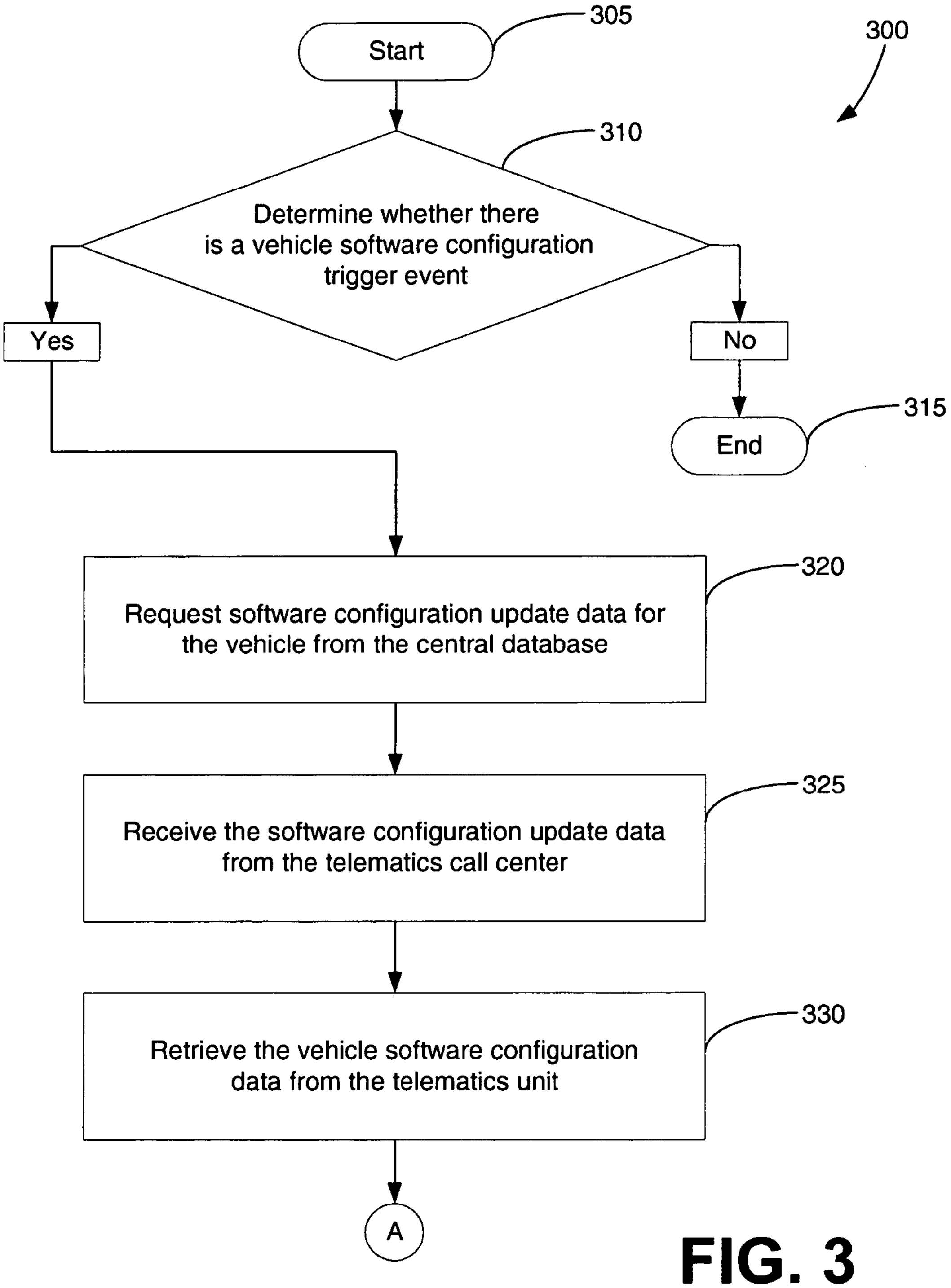
FIG. 3 is a flowchart for managing software configuration of a vehicle in accordance with one embodiment of the present invention.
Figure 3:
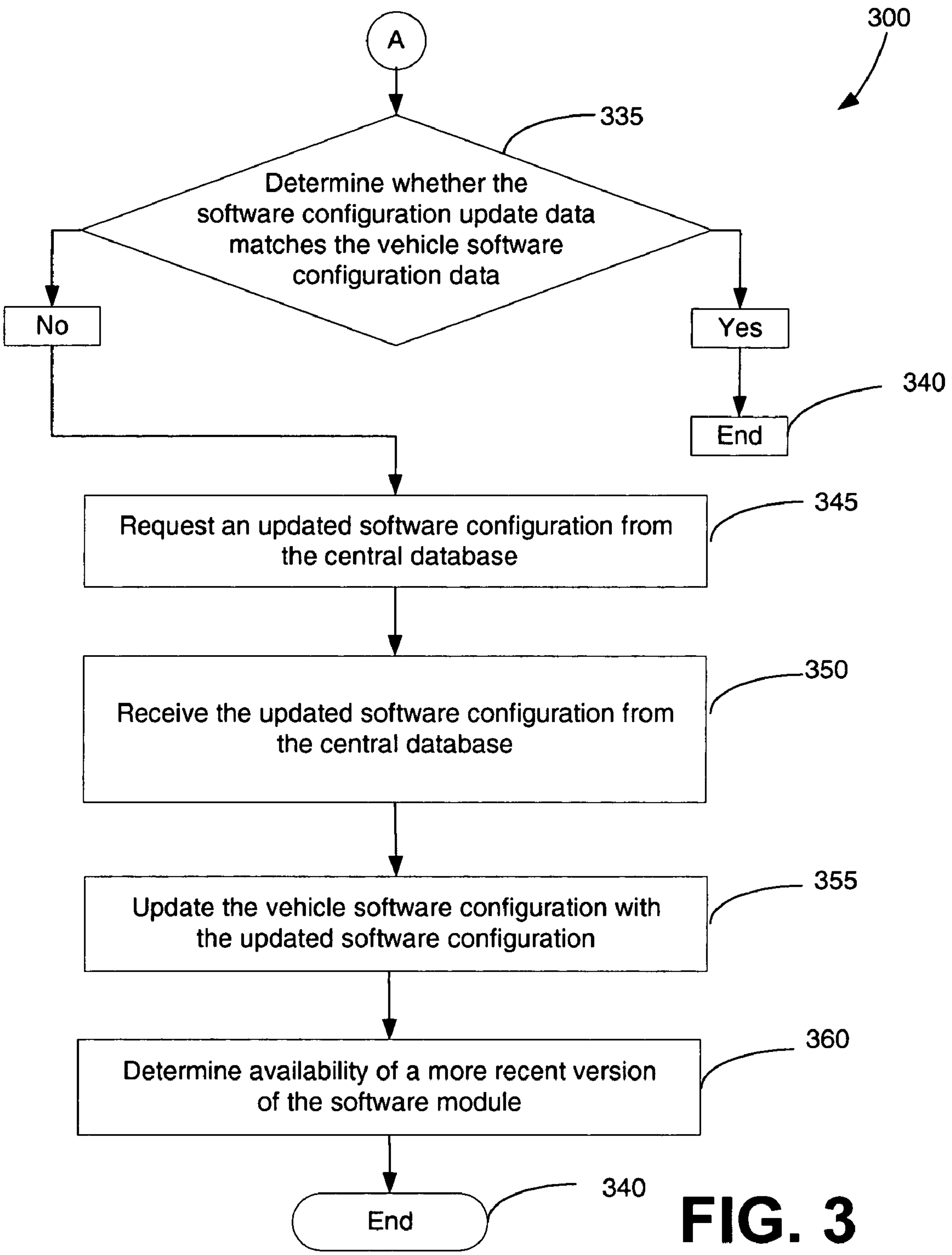

FIG. 3 is a flowchart for a method for managing the software configuration of vehicle 100 in accordance with one embodiment of the present invention at 300. A predefined set of software modules are installed in new vehicles 110. The method of managing the software configuration of the vehicle 110 enables the installation of the most recent versions of the software modules available at the central database 182 at the telematics call center 180. In addition, vehicle software modules are periodically updated to provide additional vehicle features or improve performance of existing vehicle functions. The method of managing the software configuration of the vehicle 110 facilitates upgrading the vehicle software configuration in a vehicle 110 with the most recent versions of the software modules available at the telematics call center 180. Also, controller operated vehicle components 114, 116 are often replaced during maintenance procedures and require the reinstallation of software modules for operation of the replaced vehicle components 114, 116. The method of managing the software configuration of the vehicle 110 permits the installation of the more recent versions of the software modules available at the telematics call center 180 for operation of the replaced vehicle components 114, 116. Furthermore, if a telematics unit 120 that was previously installed in a different vehicle 110, is installed in another vehicle 110, the method of managing the software configuration 300, enables the reconfiguration of the telematics unit 120 and any necessary reconfiguration of the vehicle software. It should be noted that while a number of applications of the method of managing the software configuration of a vehicle 110 have been detailed, alternative applications and adaptations of the method and system for managing vehicle software configuration are considered to be within the scope of the invention.

The method for managing the software configuration of a vehicle 300 begins (305) with determining whether there is vehicle software configuration a trigger event (block 310). A trigger event initiates the software configuration management of a vehicle 110. In one embodiment, the telematics call center 180 issues an upgrade flag to the telematics unit 120 of a vehicle 110 when an upgraded version of a software module for the vehicle 110 becomes available thereby triggering the software configuration management of the vehicle 110. In another embodiment, the telematics unit 120 of a vehicle 110 issues a status check flag to the telematics call center 180. Receipt of the status check flag at the call center 180 triggers the software configuration management of the vehicle 110. In another embodiment, the software configuration management of a vehicle 110 is triggered after a predefined period of time has elapsed following a previous vehicle software upgrade.

If no vehicle software configuration trigger event is detected, no further action is taken (block 315). If a vehicle software configuration trigger event is detected, the telematics unit 120 requests software configuration data for the vehicle 110 from the telematics call center 180 (block 320). The telematics unit 120 transmits a unique vehicle identification tag for the vehicle 110 to the server 181. The server 181 uses the unique vehicle identification tag to search for the vehicle record in the central database 182. The vehicle record includes the software configuration data for the vehicle 110. The software configuration data includes the software identification tags for the most recent versions of the software modules available at the telematics call center 180 for the operation of the controller operated vehicle components 114, 116 in the vehicle 110. The software configuration data is transmitted from the telematics call center 180 and received by the telematics unit 120 (block 325). The telematics unit 120 retrieves the vehicle software configuration data (block 330). The vehicle software configuration data is stored in the in-vehicle memory 128 and identifies the software modules that have been installed in the vehicle 110. The vehicle software configuration data includes a listing of the software identification tags for the software modules that have been installed in the vehicle 110.

The telematics unit 120 compares the updated software configuration data received from the telematics call center 180 with the vehicle software configuration data (block 335). If the list of software identification tags in the software configuration data matches the list of software identification tags in the vehicle software configuration data, the vehicle 110 has the most recent versions of the desired software modules and an update is unnecessary so the process ends (block 340). If the list of software identification tags in the updated software configuration data does not match the list of software identification tags in the vehicle software configuration data, a request is made to the central database to update the software configuration data (block 345). Upon receipt of the updated software configuration from the central database (block 350), the vehicle software configuration data is updated in the in-vehicle memory 128 (block 355).

If the list of software identification tags in the updated software configuration data does not match the list of software identification tags in the vehicle software configuration data, the vehicle software configuration data is updated with the updated software configuration data in the in-vehicle memory 128 (block 355). Once the telematics unit 120 has the software configuration data identifying the specific software modules that should be installed in the motor vehicle 110 stored in the in-vehicle memory 128, the telematics unit 120 initiates a process to update the vehicle software configuration. More specifically, the telematics unit 120 identifies and upgrades the actual software modules installed in the vehicle components 114, 116 if a more recent version of the software module is available (block 360). In one embodiment, all communications and data transmissions between the telematics unit 120 and the telematics call center 180 are conducted via the wireless communication network.

Figure 4:
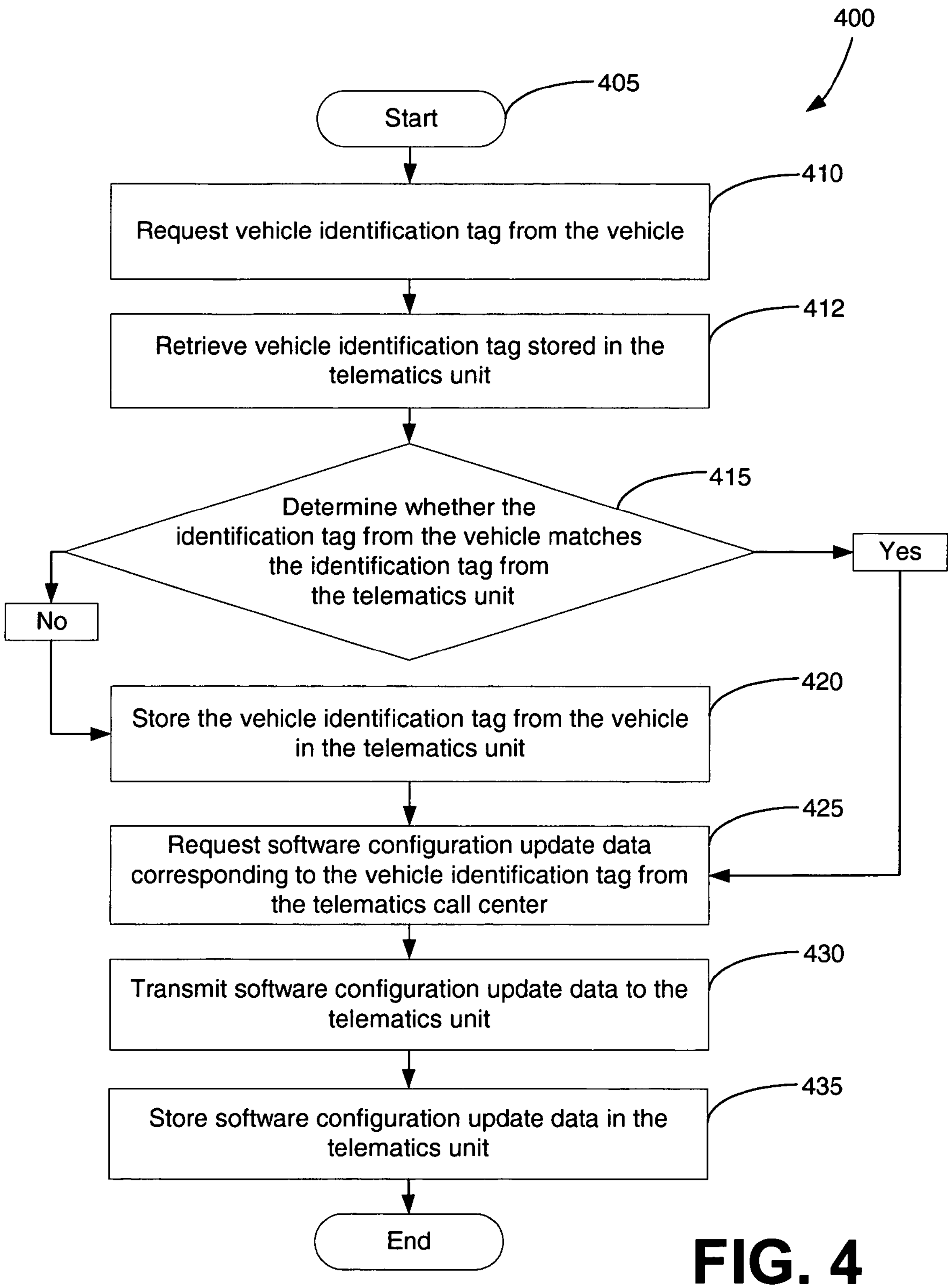
FIG. 4 is a flowchart for updating the software configuration data in a telematics unit in accordance with one embodiment of the present invention.

FIG. 4 is a flowchart for updating the vehicle software configuration data in a telematics unit 120 to reflect the software identification tags associated with the most recent versions of the software modules available at the telematics call center 180 for operation of the controller operated vehicle components 114, 116 in a specific vehicle 110 in accordance with one embodiment of the present invention. If the telematics unit 120 was previously installed in a different vehicle 110, the telematics unit 120 will have the unique vehicle identification tag for the previous vehicle 110 stored in the in-vehicle memory 128. The vehicle software configuration data stored in the in-vehicle memory 128 will also be specific to the previous vehicle 110. If the telematics unit 120 is a new unit and newly installed in the vehicle 110, default parameters for the unique vehicle identification tag and vehicle software configuration data will be stored in the in-vehicle memory 128. In one embodiment, the unique vehicle identification tag is a vehicle identification number (VIN) for the vehicle 110.

The method for updating the vehicle software configuration in the telematics unit 400 begins (block 405) with the telematics unit 120 requesting the unique vehicle identification tag for the vehicle 110 (block 410). The telematics unit 120 retrieves the vehicle identification tag stored in the in-vehicle memory 128 (the memory in the telematics unit) (block 412). The telematics unit 120 compares the unique vehicle identification tag received from the vehicle 110 to the unique vehicle identification tag retrieved from the in-vehicle memory 128 (block 415).

If the unique vehicle identification tag received from the vehicle 110 does not match the unique vehicle identification tag stored in the in-vehicle memory 128, the received unique vehicle identification tag is stored in the in-vehicle memory 128 in the telematics unit 120 as the unique vehicle identification tag for the vehicle 110 (block 420) and the method then continues to the step outlined in block 425. If the received unique vehicle identification tag matches the stored unique vehicle identification tag, the method progress directly the to the step outlined in block 425.

The telematics unit 120 then contacts the server 181 at the telematics call center 180 and issues a check status flag. The telematics unit 120 requests the software configuration data corresponding to the unique vehicle identification tag (block 425). The server 181 identifies the record associated with the unique vehicle identification tag. The identified record contains the software configuration data for the vehicle 110. The software configuration data includes the software module identification tags for the most recent versions of the software modules available at the telematics call center 180 for the operation of the controller operated vehicle components 114, 116 in the vehicle 110. The software configuration data is transmitted from the telematics call center 180 to the telematics unit 120 (block 430). The telematics unit 120 stores the received software configuration data in the in-vehicle memory 128 (block 435).

Figure 5:
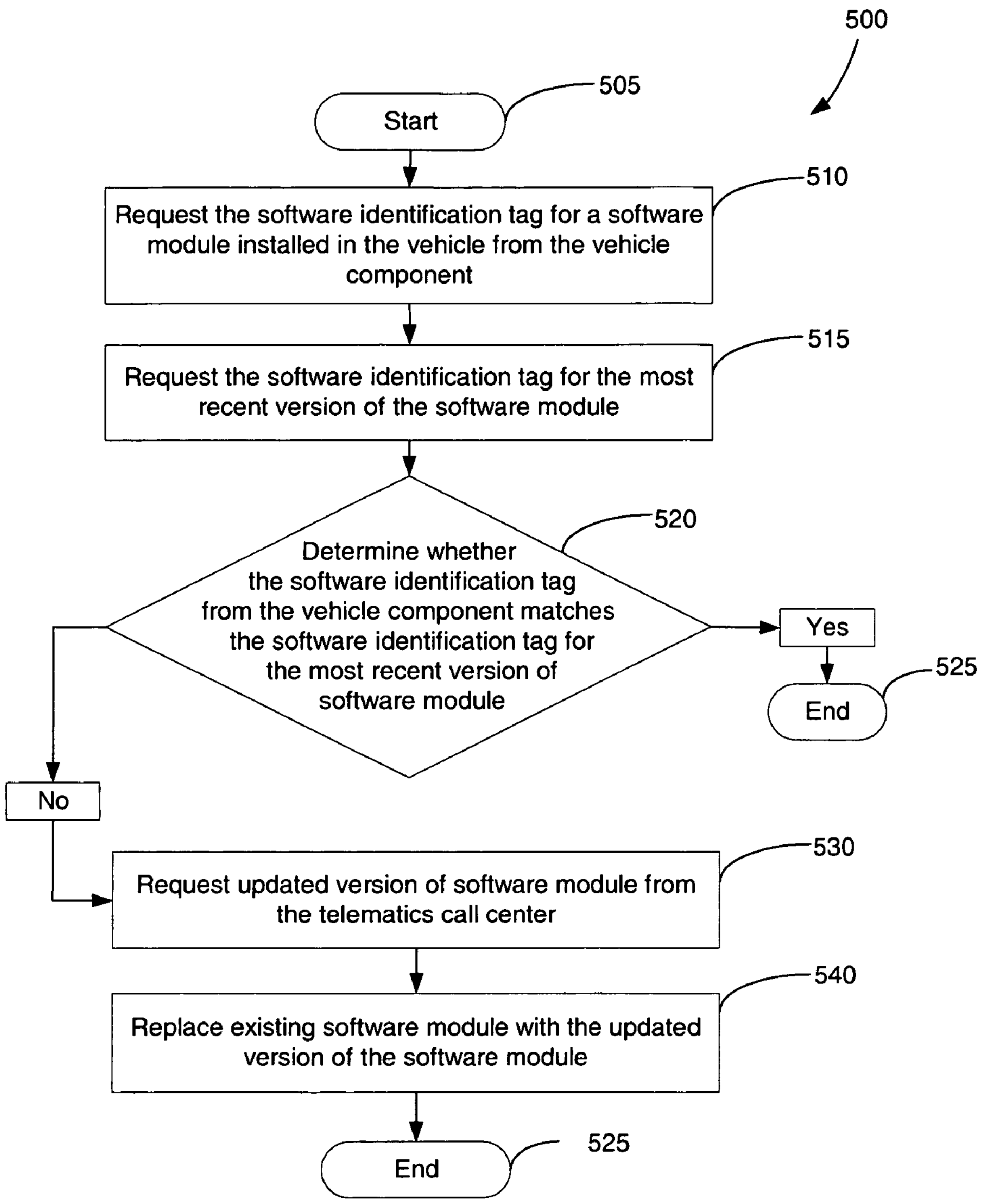
FIG. 5 is a flowchart for upgrading the software modules in a vehicle in accordance with one embodiment of the present invention.

FIG. 5 is a flowchart for a method of upgrading the software modules in the vehicle 110 in accordance with one embodiment of the present invention. In one embodiment, the telematics unit 120 periodically issues a status check flag to the telematics call center 180 to see if an upgraded software configuration data is available for the vehicle 110 and updates the software modules in accordance with the updated software configuration data. For example, the telematics unit 120 issues a status check flag every engine ignition cycle, or once every predefined time period such as once a week, once a month or once a year. In another embodiment, the telematics call center 180 initiates the upgrade process by issuing an update flag to the telematics unit 120 of a vehicle 110 when an upgraded version of a software module for the vehicle 110 is released to the telematics call center 180. In one embodiment, the telematics call center 180 sets a new software flag whenever an updated version of a software module is released. Responsive to the new software flag the telematics call center 180 identifies the vehicles 110 adapted to utilize the updated software module and issues an update flag to the telematics units 120 of those vehicles 110.

In another embodiment of the present invention, a new vehicle component 114, 116 is installed in the vehicle 110 and the newly installed vehicle component 114, 116 requires a specific software module for operation. The telematics unit 120 identifies the presence of a newly installed vehicle component 114, 116 and initiates the process by issuing a status check flag. In one embodiment, the newly installed vehicle component 114, 116 includes a version of a software module. In another embodiment, the newly installed vehicle component 114, 116 includes default parameters identifying the software module required for operation.

The method for upgrading the software modules in the vehicle 500 begins (block 505) with the telematics unit 120 retrieving the software identification tag for the software module that is actually installed in a vehicle component 114, 116 (block 510). The telematics unit 120 issues a request to a vehicle component 114, 116 for the software identification tag for the software module that is actually installed in the vehicle component 114, 116. The software identification tag identifies the vehicle component 114, 116 that the software module is adapted to control and the software module version number. The telematics unit 120 requests the software identification tag for the most recent version of the software module available from the telematics call center 180 (block 515). In one embodiment, the telematics unit 120 already has an updated software configuration data in the in-vehicle memory 128. The telematics unit 120 retrieves the software identification tag from the in-vehicle memory 128. In another embodiment, the telematics unit 120 retrieves the software identification tag from the central database 182. The telematics unit 120 transmits the software identification tag to the server 181 at the telematics call center 180. The server 181 checks the central database 182 to identify the software identification tag for the most recent version of the software module and transmits the software identification tag back to the telematics unit 120.

The telematics unit 120 compares the software identification tag retrieved from the vehicle component 114, 116 with the software identification tag for the most recent available version of the software module (block 520). If the software identification tag retrieved from the vehicle component 114, 116 matches the software identification tag for the most recent available version of the software module, the most recent available version of the software module is already installed in the vehicle component 114, 116 and the process ends (block 525). If the software identification tag retrieved from the vehicle component 114, 116 does not match the software identification tag for the most recent available version, the most recent available version of the software module is not installed in the vehicle component 114, 116 and the telematics unit 120 requests an updated version of the software module from the server 181 at the telematics call center 180 (block 530). The telematics unit 120 transmits the software identification tag for the most recent available version of the software module and the server 181 uses the received software identification tag to retrieve and transmit the associated software module. Once the telematics unit 120 receives the updated software module, it replaces the older version of the software module in the vehicle component 114, 116 with the updated software module (block 540). Method 500 ends at 525.

The above-described methods and implementation for the vehicle software configuration management and associated information are example methods and implementations. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

What is claimed is:

1. A method for remotely updating software stored in a memory device of a vehicle equipped with a telematics unit, the method comprising:

initiating remote communication between a call center and the telematics unit;

uploading from the telematics unit to the call center a vehicle software configuration for the software stored in the memory device;

comparing the vehicle software configuration with a standard stored in the call center; and downloading via a wireless network from the call center to the telematics unit updated software to replace the software stored in the memory device when the vehicle software configuration differs from the standard stored in the call center.

2. A method as set forth in claim 1 including the step of identifying a trigger event prior to the step of initiating remote communication.

3. The method of claim 2, wherein the trigger event is selected from the group consisting of a predefined time period, an update flag generated by the call center, and a status check flag generated by the vehicle.

4. The method of claim 1, wherein uploading the vehicle software configuration further comprises retrieving vehicle software configuration data from the telematics unit.

5. The method of claim 1, further comprising determining the vehicle software configuration by querying a vehicle component.

6. The method of claim 1, further comprising the step of requesting a listing of software modules for the vehicle and wherein uploading the vehicle software configuration further comprises retrieving a listing of software modules installed in the vehicle.

7. The method of claim 6, wherein comparing the vehicle software configuration with the standard further includes determining whether the listing of software modules for the vehicle matches the listing of modules installed on the vehicle.

8. The method of claim 1, wherein uploading the vehicle software configuration further comprises:

requesting a first vehicle identification tag from the vehicle;

retrieving a second vehicle identification tag from the telematics unit;

determining whether the first vehicle identification tag corresponds with the second vehicle identification tag; and storing the first vehicle identification tag in the telematics unit if the first vehicle identification tag does not match the second vehicle identification tag.

9. The method of claim 1, wherein the updated software comprises a software identification tag identifying a version of the updated software.

* * * * *